United States Patent [19]

Buschmann

[11] 4,223,806
[45] Sep. 23, 1980

[54] APPARATUS FOR THE PULSED DISPENSATION OF VERY SMALL AMOUNTS OF LIQUID, ESPECIALLY HYDROGEN PEROXIDE

[75] Inventor: Gerhard Buschmann, Düsseldorf, Fed. Rep. of Germany

[73] Assignee: Jagenberg Werke Aktiengesellschaft, Düsseldorf, Fed. Rep. of Germany

[21] Appl. No.: 880,527

[22] Filed: Feb. 23, 1978

[30] Foreign Application Priority Data

Feb. 26, 1977 [DE] Fed. Rep. of Germany ....... 2708422

[51] Int. Cl.² .............................................. B67D 5/32
[52] U.S. Cl. ...................................... 222/23; 222/63; 222/64
[58] Field of Search ....................... 222/52, 63, 64, 66, 222/67, 23, 333

[56] References Cited

U.S. PATENT DOCUMENTS

| | | | |
|---|---|---|---|
| 3,194,434 | 7/1965 | Evanson | 222/67 X |
| 3,224,638 | 12/1965 | Harrell | 222/64 |
| 3,476,291 | 11/1969 | Glaser | 222/64 X |
| 3,664,549 | 5/1972 | Maselli | 222/64 |
| 3,981,414 | 9/1976 | Gust et al. | 222/66 X |

*Primary Examiner*—Joseph J. Rolla
*Attorney, Agent, or Firm*—Sprung, Felfe, Horn, Lynch & Kramer

[57] ABSTRACT

In an apparatus for the pulse-wise dispensing of very small amounts of liquid controlled with a measuring instrument. The measuring instrument comprises an ejector for the pulse-wise ejection of a desired amount of liquid and a measuring vessel having a volume greater than the volume of the liquid to be ejected for each pulse. The measuring vessel has an outlet connected to the ejector and a cross-section of the vessel is adapted to the amounts of liquid to be controlled. A sensing apparatus has an upper and lower sensing device positioned at the vessel and responsive to the level of the liquid therein with an accuracy of about from 1 to 5 amounts of liquid to be ejected and which generates a signal when the upper and lower sensing devices are activated. A pulse generator is synchronized with the ejector and a counter receives counting pulses from the pulse generator and is activated to start by the upper sensing device and to stop by the lower sensing device whereby the known volume in the vessel, divided by the number of pulses counted by the counter, measures the amount of liquid ejected by the ejector for each pulse.

5 Claims, 2 Drawing Figures

APPARATUS FOR THE PULSED DISPENSATION OF VERY SMALL AMOUNTS OF LIQUID, ESPECIALLY HYDROGEN PEROXIDE

BACKGROUND

The invention concerns an apparatus for the pulsed dispensing of very small amounts of liquid under the control of a measuring apparatus (amounts, for example, of 0.1 to 1 cm$^3$), especially for use in sterilizing apparatus operating with hydrogen peroxide, especially for milk containers.

In the sterilizing of milk containers consisting of plastic coated cardboard, a very small amount of hydrogen peroxide is injected into the container. In a one-liter container, the standard amount is about 0.3 cm$^3$, whereas in a half-liter container it is about 0.2 cm$^3$. If too small an amount of hydrogen peroxide is injected, complete sterilization is no longer assured; if, however, too great an amount of hydrogen peroxide is injected, not only is the excess wasted, but also it has a negative influence on the milk. The need for trouble-free sterilization of containers therefore involves the precise metering of the amount of liquid to be injected in each container. This ncessitates a constant control of the amount of liquid.

It has already been attempted to achieve this control with a flow meter. In practice, however, it has been found that, where a pulsing dispensation of very small amounts of liquid is involved, a flow meter does not permit sufficiently precise measurements.

THE INVENTION

The invention is addressed to the problem of creating an apparatus for the pulsed dispensation of very small amounts under the control of a measuring instrument, which will be simple in construction and will permit the uninterrupted dispensing of the liquid.

This problem is solved in accordance with the invention by the fact that the measuring instrument has a measuring vessel which can be filled with a relatively larger amount of liquid (10 cm$^3$, for example), whose outlet is connected to a means for the ejection of the small amount of liquid, and whose cross section is adapted to the small amount of liquid to be controlled such that a sensing apparatus having an upper and a lower sensing means responds with the accuracy of about one to five small amounts of liquid, the sensing apparatus activating, for the time of the removal of liquid from the measuring vessel, a counter which receives counting pulses from a pulse generator triggered by the ejecting means or, in the case of an ejecting means delivering a constant ejection quantity per unit of time, from a pulse generator supplying time pulses.

According to a first alternative construction, the measuring vessel can be filled with the liquid from the reservoir through a valve controlled by the sensing apparatus, the feeding of liquid to the measuring instrument being switchable from the reservoir to the measuring vessel.

According to a second alternative construction, the measuring vessel can be filled with liquid from a reservoir situated lower than the measuring vessel through a pump controlled by the sensing apparatus, and the delivery of liquid to the ejecting means being switchable from the reservoir to the measuring vessel by shutting off the pump.

According to a further development, a computer is connected to the counter and divides the amount of liquid taken from the measuring vessel by the total number of counting pulses. The output signal corresponds to the liquid consumption per container or per unit of time, as the case may be. The output signal of the computer can be delivered to a comparator for a maximum value and a comparator for a minimum value, which give a warning signal when the prescribed value is exceeded or is not reached.

With the apparatus of the invention, the amount of liquid dispensed by each ejection can be determined accurately in a simple manner, without the need for interrupting the pulsed dispensing of the liquid.

BRIEF DESCRIPTION OF THE DRAWINGS

The invention will be further explained with the aid of a drawing wherein.

DETAILED DESCRIPTION OF THE INVENTION

Figure 1:
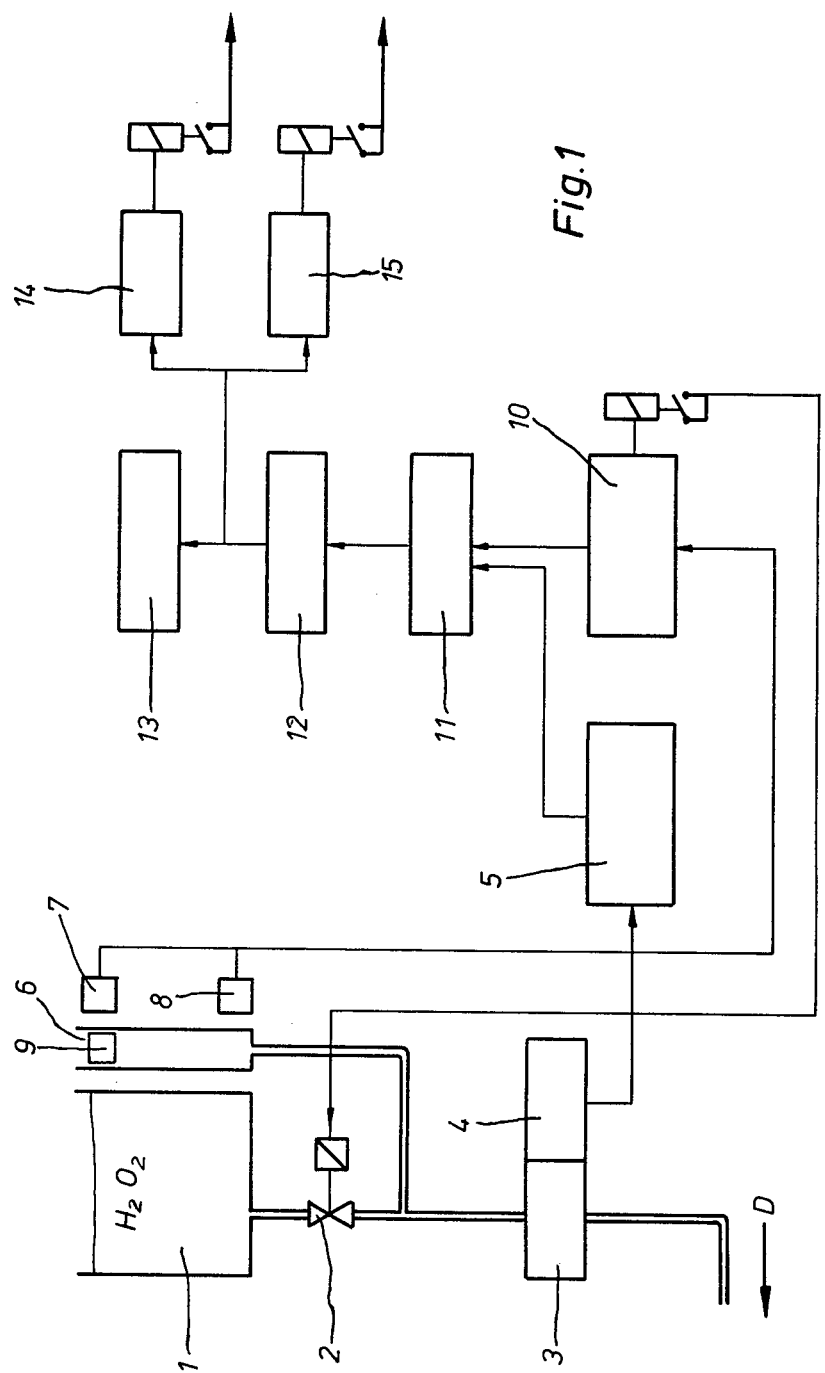
FIG. 1 is a schematic of one embodiment of the present invention.

A reservoir 1 is filled with hydrogen peroxide as sterilant. Hydrogen peroxide passes from the reservoir 1 through an open valve 2 to an ejecting member 3 which feeds very small amounts of liquid pulse-wise to a nozzle (D). The ejecting member 3 is combined with a pulse generator 4 which delivers a pulse to a pulse shaper 5 for each very small amount of liquid ejected.

When the valve 2 is open, hydrogen peroxide also passes into a measuring vessel 6. With the measuring vessel 6 there is associated a sensing system having an upper sensing means 7 and a lower sensing means 8. The sensing means 7 and 8 respond to the liquid level in the measuring vessel 6, namely to the float 9. The float 9 can be eliminated if the sensing means 7 and 8 are in the form of level detectors.

The sensing system 7–8 controls the valve 2 and a counter 11 through a start-stop system 10 according to the liquid level in the measuring vessel 6. This is accomplished in the following manner: with valve 2 open, when hydrogen peroxide passes through the ejecting member 3 to the nozzle D and also to the measuring vessel 6, the sensing means 7 sends a signal to the start-stop system 10 as soon as the float 9 reaches the level of this sensing means. The start-stop system 10 in turn at this instant gives a switching signal to valve 2; this valve is closed, so that no more liquid is taken from the reservoir 1. The liquid for the nozzle now comes exclusively from the measuring vessel 6. Simultaneously with the switching signal, the start-stop system, however, also gives a start signal to the counter 11 which is thereby opened to the counting pulses which come from the pulse generator 4 through the pulse shaper 5. As soon as the float 9 has dropped to the level of the sensing means 8, this sensing means gives a signal to the start-stop system 10. This in turn gives a switching signal to the valve 2 which opens, so that the measuring vessel 6 is refilled and the liquid for the nozzle is taken from the reservoir 1. Simultaneously with the switching signal, a stop signal also goes to the counter 11, which is closed to the counting pulses which come from the pulse generator 4 through the pulse former 5.

The counted number of pulses then enters into a computer 12 which divides the known amount of liquid between the levels of sensing means 7 and sensing means 8 by the number of counted plates. In this manner the computer output gives the amount of liquid dispensed per ejection and also per container. This value is delivered to the indicator means 13 and to comparators 14 and 15 for maximum and minimum value. As long as the value in computer 12 is in the tolerance range between the maximum and minimum set values, the comparators 14 and 15 emit no output signal. In such a case no readjustment of the ejection amount needs to be undertaken.

As soon as the float 9, upon the filling of the measuring vessel 6, reaches the level of the upper sensing means 7, the action described is repeated. It is apparent that, prior to the next count, the counter 11 has to be reset. This can be accomplished simultaneously with the delivery of the count to the computer 12.

Figure 2:
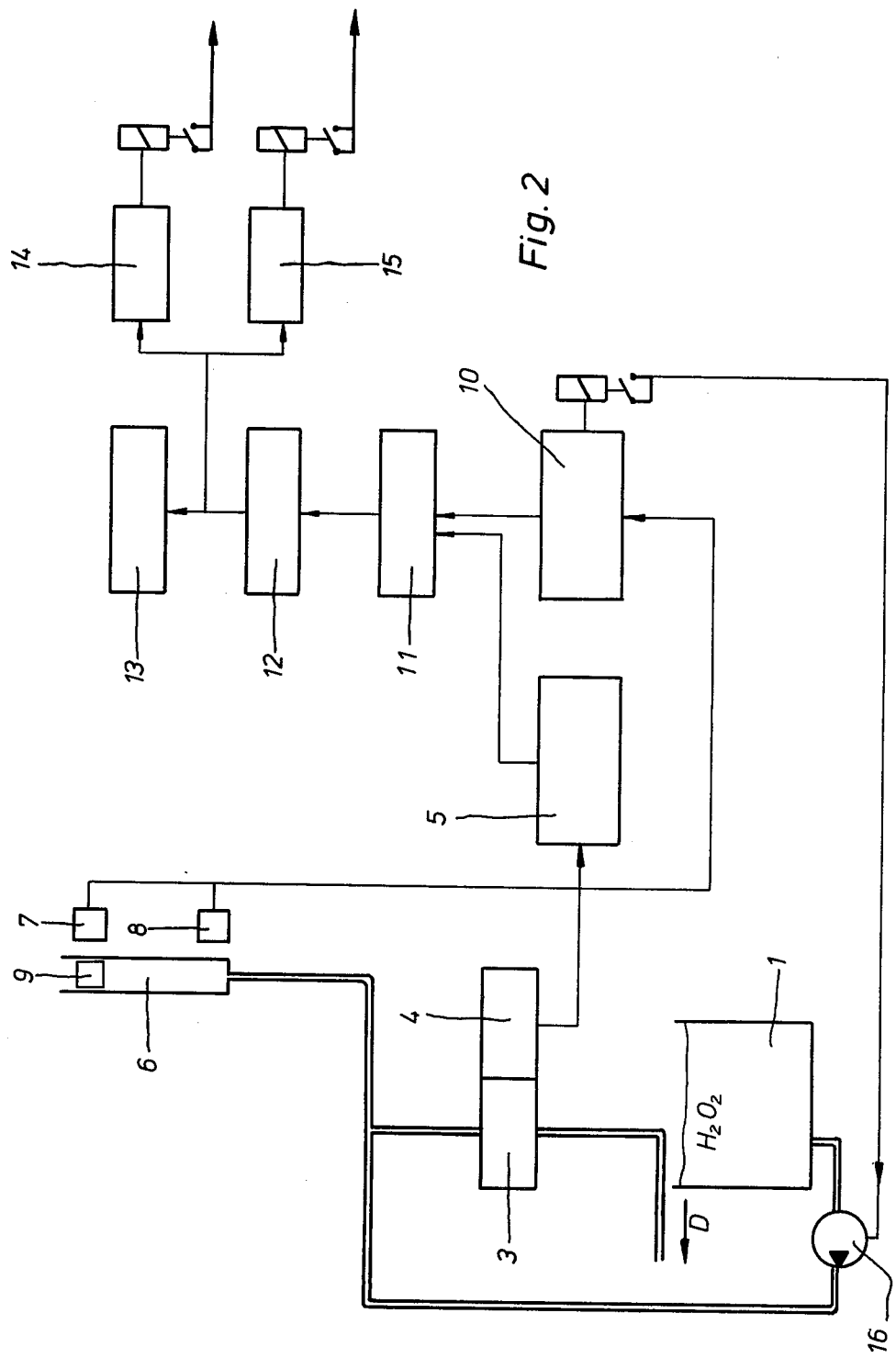
FIG. 2 is a schematic of another embodiment of the present invention.

In a variant embodiment of the invention (FIG. 2), the reservoir 1 is disposed underneath the measuring vessel 6. The liquid must thus be pumped upward. Instead of the valve 2, a pump 16 is installed. As long as the pump 16 is turned on, the measuring vessel 6 will fill. The pump 16 is shut off by the sensing means 7 through the start-stop system 10 when the upper liquid level is reached; it is turned on by the sensing means 8 when the lower level is reached. Otherwise, this embodiment is equal in construction and operation to the first embodiment.

It will be appreciated that the instant specification and claims are set forth by way of illustration and not limitation, and that various modifications and changes may be made without departing from the spirit and scope of the present invention.

What is claimed is:

1. An apparatus for the pulse-wise dispensing of very small amounts of liquid controlled with a measuring instrument, wherein the improvement comprises the measuring instrument comprising ejecting means for the pulse-wise ejection of a desired amount of liquid, a measuring vessel having a volume greater than the volume of the liquid to be ejected for each pulse and having an outlet connected to the ejecting means and wherein the cross section of the vessel is adapted to the amount of liquid to be controlled, sensing means having an upper and a lower sensing device positioned at said vessel and responsive to the level of the liquid therein with an accuracy of about from one to five amounts of liquid to be ejected and generating a signal when the upper and lower sensing devices are activated, a pulse generator synchronized with the ejecting means, a reservoir situated lower than the measuring vessel, a pump controlled by the sensing means for pumping liquid from the reservoir to the vessel, whereby shutting the pump on and off alternately feeds liquid to the ejecting means from the reservoir or the measuring vessel and a counter which receives counting pulses from the pulse generator and is activated to start by the upper sensing means and to stop by the lower sensing means whereby the known volume in the vessel, divided by the number of pulses counted by the counter, measures the amount of liquid ejected by the ejecting means for each pulse.

2. Apparatus of claim 1, further comprising a computer connected to the counter and dividing the known amount of liquid taken from the measuring vessel by the total number of counted pulses.

3. Apparatus of claim 1, wherein the pulse generator is triggered by the ejecting means.

4. An apparatus for the pulse-wise dispensing of very small amounts of liquid controlled with a measuring instrument, wherein the improvement comprises the measuring instrument comprising ejecting means for the pulse-wise ejection of a desired amount of liquid, a measuring vessel having a volume greater than the volume of the liquid to be ejected for each pulse and having an outlet connected to the ejecting means and wherein the cross section of the vessel is adapted to the amounts of liquid to be controlled, sensing means having an upper and a lower sensing device positioned at said vessel and responsive to the level of the liquid therein with an accuracy of about from one to five amounts of liquid to be ejected and generating a signal when the upper and lower sensing devices are activated, a pulse generator synchronized with the ejecting means, a counter which receives counting pulses from the pulse generator and is activated to start by the upper sensing means and to stop by the lower sensing means whereby the known volume in the vessel, divided by the number of pulses counted by the counter, measures the amount of liquid ejected by the ejecting means for each pulse, a reservoir of liquid and a valve through which the liquid flows to fill the vessel from the reservoir and controlled by the sensing means whereby the delivery of liquid to the ejecting means can be switched by the valve from the reservoir to the measuring vessel.

5. An apparatus for the pulse-wise dispensing of very small amounts of liquid controlled with a measuring instrument, wherein the improvement comprises the measuring instrument comprising ejecting means for the pulse-wise ejection of a desired amount of liquid, a measuring vessel having a volume greater than the volume of the liquid to be ejected for each pulse and having an outlet connected to the ejecting means and wherein the cross section of the vessel is adapted to the amounts of liquid to be controlled, sensing means having an upper and a lower sensing device positioned at said vessel and responsive to the level of the liquid therein with an accuracy of about from one to five amounts to liquid to be ejected and generating a signal when the upper and lower sensing devices are activated, a pulse generator synchronized with the ejecting means, a counter which receives counting pulses from the pulse generator and is activated to start by the upper sensing means and to stop by the lower sensing means whereby the known volume in the vessel, divided by the number of pulses counted by the counter, measures the amount of liquid dispensed by the ejecting means for each pulse, a computer connected to the counter and dividing the known amount of liquid taken from the measuring vessel by the total number of counted pulses, a comparator connected to the output signal of the computer for comparing same to a maximum value and a comparator connected to the output signal of the computer for comparing same to a minimum value for developing a warning signal when the prescribed value is exceeded or not reached.

* * * * *